United States Patent [19]
Maddock

[11] 3,756,574
[45] Sept. 4, 1973

[54] THERMOPLASTIC MATERIAL MIXING
[75] Inventor: Bruce H. Maddock, Fanwood, N.J.
[73] Assignee: Union Carbide Corporation, New York, N.Y.
[22] Filed: June 17, 1971
[21] Appl. No.: 154,013

[52] U.S. Cl. .............................................. 259/193
[51] Int. Cl. .............................................. B29f 3/00
[58] Field of Search .................... 259/191, 192, 193, 259/97, 9, 10, 25, 26, 45, 46; 425/202, 209, 472

[56] References Cited
UNITED STATES PATENTS
3,319,299   5/1967   Kiraly ..:.............................. 259/191
3,486,192  12/1969   LeRoy ............................ 425/202 X Primary Examiner—Robert W. Jenkins
Assistant Examiner—Philip R. Coe
Attorney—Paul A. Rose et al.

[57] ABSTRACT

Apparatus is disclosed for; heating thermoplastic material to a flowable condition; longitudinally advancing the heated material under pressure toward the discharge end of the apparatus with a rotating extrusion screw having a mixer head at the downstream end thereof; passing the partially fluxed and mixed melt into the interior of the mixer head; passing a plurality of individual streams of said partially fluxed and mixed melt through high shear zones between said mixer head and the barrel of said extrusion apparatus; and passing said plurality of streams through swirling mixing zones in a plurality of substantially longitudinal passages to a region of merger of said streams.

5 Claims, 3 Drawing Figures

PATENTED SEP 4 1973          3,756,574

INVENTORS
BRUCE H. MADDOCK
BY
ATTORNEY 3,756,574

THERMOPLASTIC MATERIAL MIXING

The present invention relates to the mixing of thermoplastic materials and, more particularly, to apparatus for the fluxing and mixing of synthetic organic thermoplastic resins.

A wide variety of apparatus have been proposed for the fluxing and mixing of thermoplastic materials. The essential requirements for such apparatus include rapid fluxing or melting of the material and efficient mixing of the material components into a homogeneous blend, both at an effectively high throughput rate. Whereas some prior apparatus is capable of satisfying the desired fluxing and mixing requirements, they are incapable of delivering the necessary throughput rate. Other prior apparatus sacrifices fluxing and/or mixing efficiency in order to provide the required throughput rate.

Accordingly, it is the prime object of the present invention to provide apparatus for the mixing of thermoplastic materials having high fluxing and mixing efficiency and capable of delivering a high material throughput rate.

Other objects and advantages will be apparent from the following description and appended claims.

In accordance with the present invention, apparatus is provided for fluxing and mixing thermoplastic material involving the steps of: (a) heating thermoplastic material to a flowable condition in extrusion apparatus; (b) longitudinally advancing the heated material under pressure toward the discharge end of the apparatus with a rotating extrusion screw having a mixer head at the downstream end thereof, thereby forming a partially fluxed and mixed melt; (c) passing said partially fluxed and mixed melt into the interior of the mixer head; (d) passing a plurality of individual streams of said partially fluxed and mixed melt through high shear zones between said mixer head and the barrel of said extrusion apparatus to obtain a fully fluxed melt; (e) and passing said plurality of streams through swirling mixing zones in a plurality of substantially longitudinal passages to a region of merger of said streams near the downstream discharge end of said extrusion apparatus to obtain a fully fluxed and mixed melt.

More specifically, initial fluxing or melting of the thermoplastic mix is first effected in a conventional screw section of the extruder. Initial mixing of the components of the thermoplastic mix is also carried out in this stage. The partially fluxed and mixed material is then passed into the interior of the mixer head and out in a plurality of streams into high shear zones which effect complete fluxing of the material. After complete fluxing, the material is finally mixed in a swirling mixing zone to effect complete mixing of the thermoplastic material.

In accordance with the invention, apparatus is provided for the mixing of thermoplastic materials having a hollow barrel; screw means mounted in said barrel to advance material through said barrel; mixer head means longitudinally mounted in said barrel on the terminal end of said screw means to shearingly engage material between said mixer head means and said barrel; hollow internal passage means positioned axially within said mixer head means over a substantial portion of its terminal length; radial inlet port means at the upstream end of said mixer head means for the passage of material to said internal passage of said mixer head means; a plurality of groove means arranged to extend substantially longitudinally in the surface of said mixer head means, said groove means closed at the upstream ends and open at the downstream ends; and a plurality of radial outlet conduits communicating between said internal passage means and the exterior of said mixer head means.

It is preferred that each of the outlet conduits are positioned between a pair of lands positioned, in turn, between the groove means. Each pair of lands comprises a full diameter cleaning land, having close clearance with the interior walls of the hollow barrel of the extruder, and a reduced diameter shearing land which provides a region of high shear between the land barrel of the extruder. The cleaning lands are located on the leading sides of the outlet conduits and the shearing lands are located on the trailing sides of the outlet conduits (as defined by the direction of rotation of the mixer head means).

IN THE DRAWING

Figure 1:
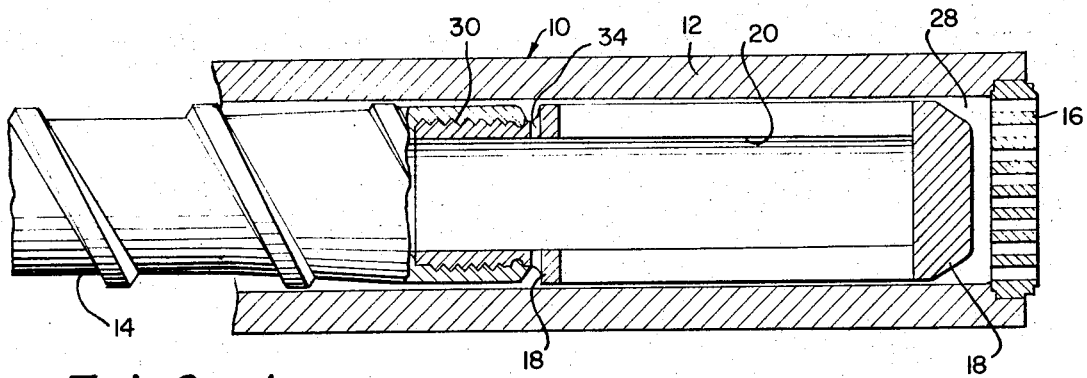
FIG. 1 is a cross-sectional view of extruder apparatus embodying the invention.
Figure 2:
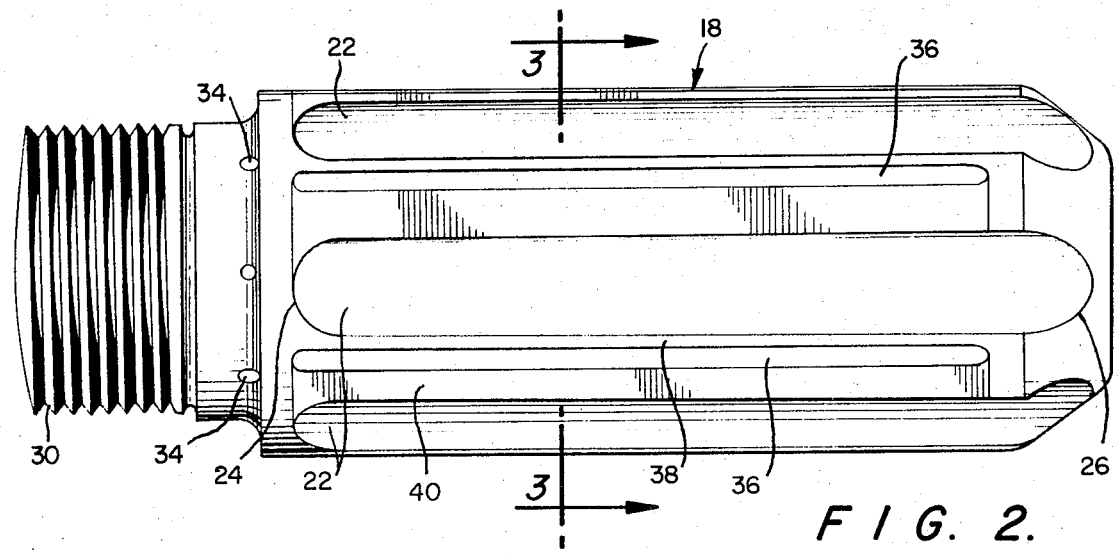
FIG. 2 is an elevational view of mixer head means employed in the embodiment of FIG. 1.

Referring specifically to the embodiment of the drawing, extruder 10 is provided having outer housing 12, screw means 14 and breaker plate 16. Cylindrical mixer head means 18 is positioned on the terminal (downstream) end of screw means 14 and comprises an internal axial passage 20 and a plurality of external longitudinal groove means 22 closed on the upstream ends 24 and opening on the downstream ends 26 into a common chamber 28 which discharges to breaker plate 16.

Mixer head means 18 is secured to screw means 14 as by screw threads 30.

As thermoplastic material is fed to extruder 10, it is partially fluxed in the upstream portion of the extruder by screw means 14. The partially fluxed material is passed through radial inlet ports 34 to the interior of internal passage 20 of mixer head means 18.

The material is forced out of the internal passage of the mixer head means as separate streams through a plurality of radial outlet conduits or slots 36 positioned longitudinally between the cleaning lands 38 and shearing lands 40, in turn, positioned between the grooves 22 on the exterior surface of the mixer head means.

Figure 3:
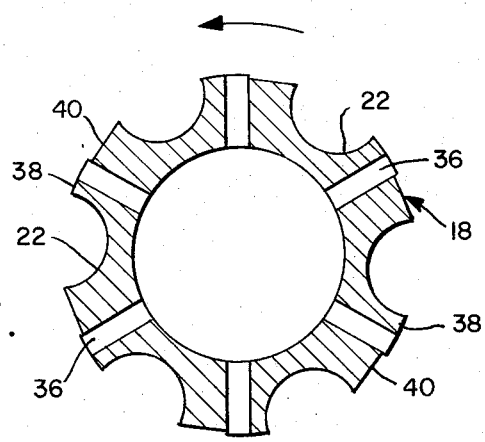
FIG. 3 is a sectional view taken along the line 3—3 of FIG. 2.

As shown in FIG. 3, it is preferred that the cleaning lands 38 are of full diameter and that the shearing lands 40 are of reduced diameter. Such configuration of slots and lands provides a high shear zone between the shearing lands 40 and the internal barrel wall of the extruder which fully fluxes the thermoplastic material mix. The fully fluxed mix streams are then passed to the plurality of grooves 22 where they are fully mixed to a homogeneous state by a circular, swirling action in the grooves caused by the feed and rotational movement of the mixer head means within the extruder barrel. It has been noted that this circular, swirling action of the thermoplastic material streams provides a self-mixing or self-cleaning action which acts to prevent the buildup or clogging of material in the grooves of the mixer head means.

As the fully fluxed and mixed thermoplastic material streams are passed along and out the plurality of longitudinal grooves they commonly discharge to chamber 28 upstream of breaker plate 16.

What is claimed is:

1. In an extruder having a hollow barrel, screw means mounted in said barrel to advance material through said barrel, and mixer head means longitudinally mounted in said barrel near the terminal end of said screw means and in close clearance therewith to shearingly engage material between said mixer head means and said barrel, the improvement which comprises:
   a. hollow internal passage means positioned axially within said mixer head means over a substantial portion of its terminal length and closed at the downstream end thereof;
   b. radial inlet port means at the upstream end of said mixer head means for the passage of material to said internal passage of said mixer head means;
   c. a plurality of groove means arranged to extend substantially longitudinally in the surface of said mixer head means, said groove means closed at the upstream ends and open at the downstream ends; and
   d. a plurality of radial outlet conduits positioned between said plurality of groove means and communicating between said internal passage means and the exterior of said mixer head means.

2. Apparatus in accordance with claim 1, wherein said outlet conduits are positioned between a pair of lands, in turn, positioned between said groove means.

3. Apparatus in accordance with claim 2 wherein each pair of lands comprises a cleaning land of full diameter and a shearing land of reduced diameter to form a shearing zone in cooperation with said barrel, said cleaning land and said shearing land being positioned, respectively, on the leading and trailing sides of said outlet conduits with respect to the direction of rotation of said mixer head means.

4. Apparatus in accordance with claim 2, wherein said outlet conduits comprise longitudinal slots running substantially the entire length of said groove means.

5. Apparatus in accordance with claim 4, wherein each pair of lands comprises a cleaning land of full diameter and a shearing land of reduced diameter to form a shearing zone in cooperation with said barrel, said cleaning land and said shearing land being positioned, respectively, on the leading and trailing sides of said outlet conduits with respect to the direction of rotation of said mixer head means.

* * * * *